(12) United States Patent
Sleath et al.

(10) Patent No.: US 8,875,377 B2
(45) Date of Patent: Nov. 4, 2014

(54) APPARATUS AND METHOD FOR LOCATING A NUT ON A BLIND SIDE OF A FASTENER HOLE

(75) Inventors: Trevor George Sleath, Bellevue, WA (US); Andrew Philip Mott, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 13/399,013

(22) Filed: Feb. 17, 2012

(65) Prior Publication Data

US 2013/0212862 A1    Aug. 22, 2013

(51) Int. Cl.
*B23P 17/00*    (2006.01)

(52) U.S. Cl.
USPC .................. 29/525.01; 29/525.02; 29/525.11; 29/428

(58) Field of Classification Search
USPC .................... 29/525.01, 428, 525.02, 525.03, 29/525.11, 525.08, 33.2, 563, 766, 768
See application file for complete search history.

(56) References Cited

U.S. PATENT DOCUMENTS

| | | | |
|---|---|---|---|
| 2,258,342 A | | 10/1941 | Tinnerman |
| 3,835,525 A | * | 9/1974 | King, Jr. .......................... 29/412 |
| 6,302,000 B1 | | 10/2001 | Smith |
| 7,591,207 B1 | | 9/2009 | Burkhardt |
| 2008/0169656 A1 | | 7/2008 | Barry et al. |

OTHER PUBLICATIONS

Fatigue Technology Inc., Focus of FTI, newsletter, Jun. 2004.
International Search Report and Written Opinion dated Apr. 4, 2013 issued in co-pending PCT/US2013/021477.
International Search Report and Written Opinion dated Aug. 19, 2014 in co-pending PCT Patent Application No. PCT/US2013/021477.

* cited by examiner

*Primary Examiner* — Christopher Besler
(74) *Attorney, Agent, or Firm* — Joseph M. Rolnicki; Evans & Dixon, LLC

(57) ABSTRACT

An apparatus and its method of use locate a first piece of a two piece fastener assembly, for example a nut of a nut and bolt fastener assembly on a blind side of a fastener hole in a structure wall where the fastener hole on the blind side of the wall is not manually accessible or not easily manually accessible. The apparatus then holds the nut in alignment with the fastener hole enabling the bolt of the fastener assembly to then be inserted through the fastener hole from the structure exterior and connected to the nut in the interior of the structure.

10 Claims, 10 Drawing Sheets

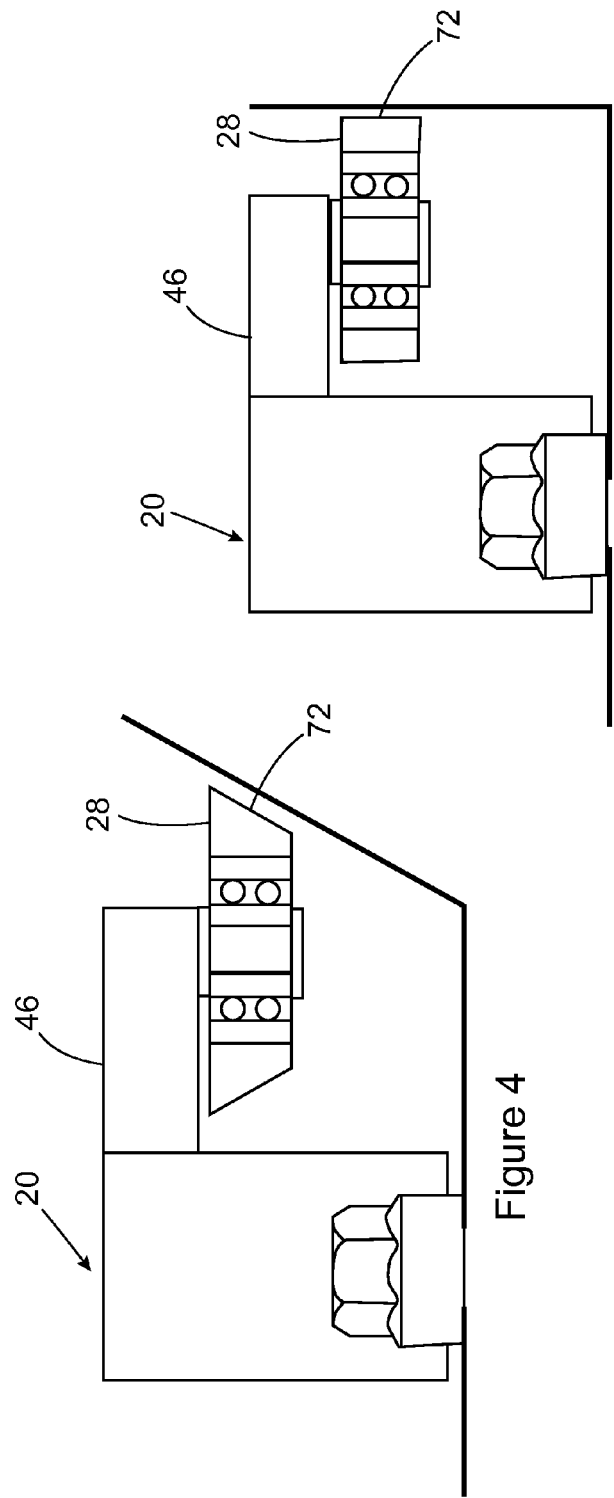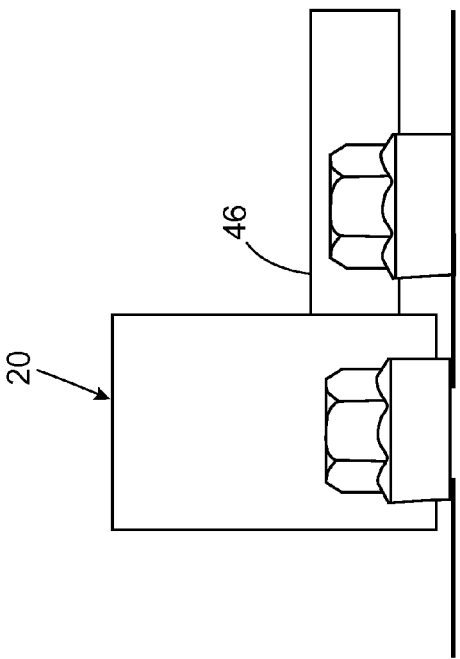

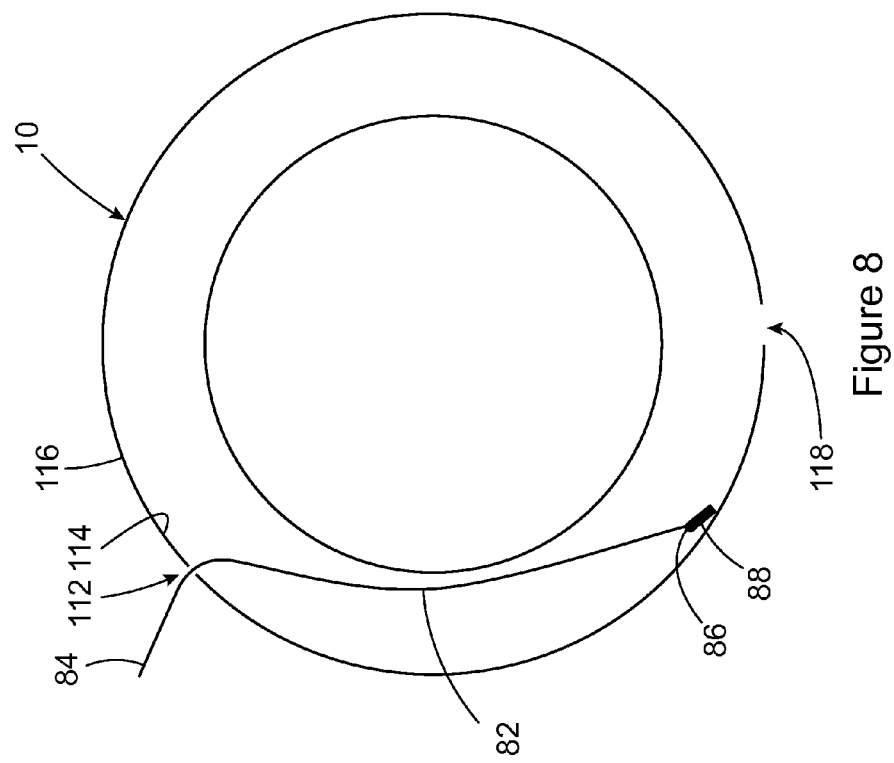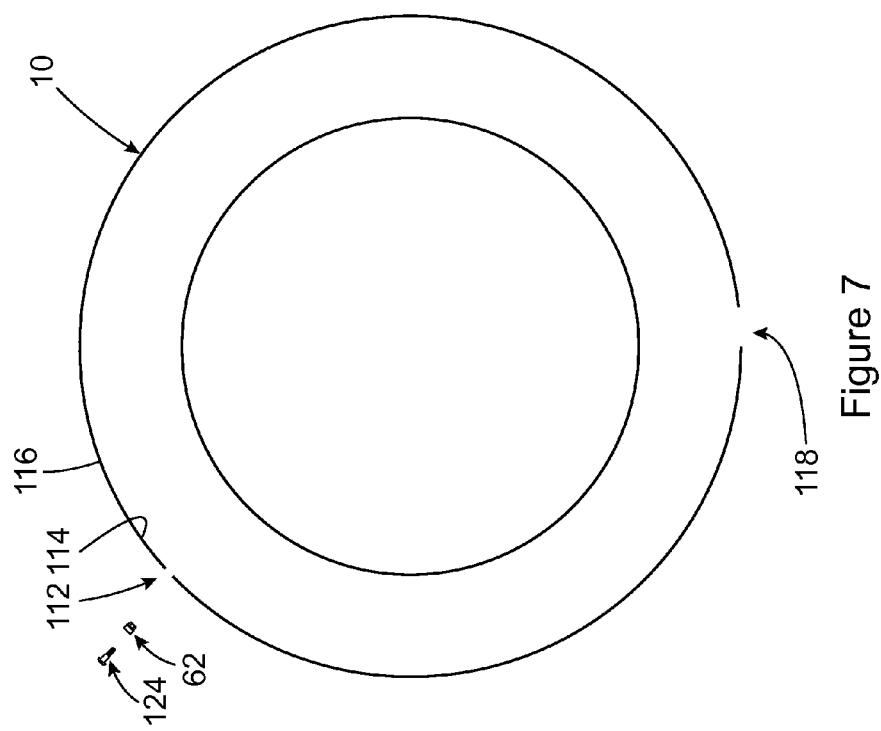

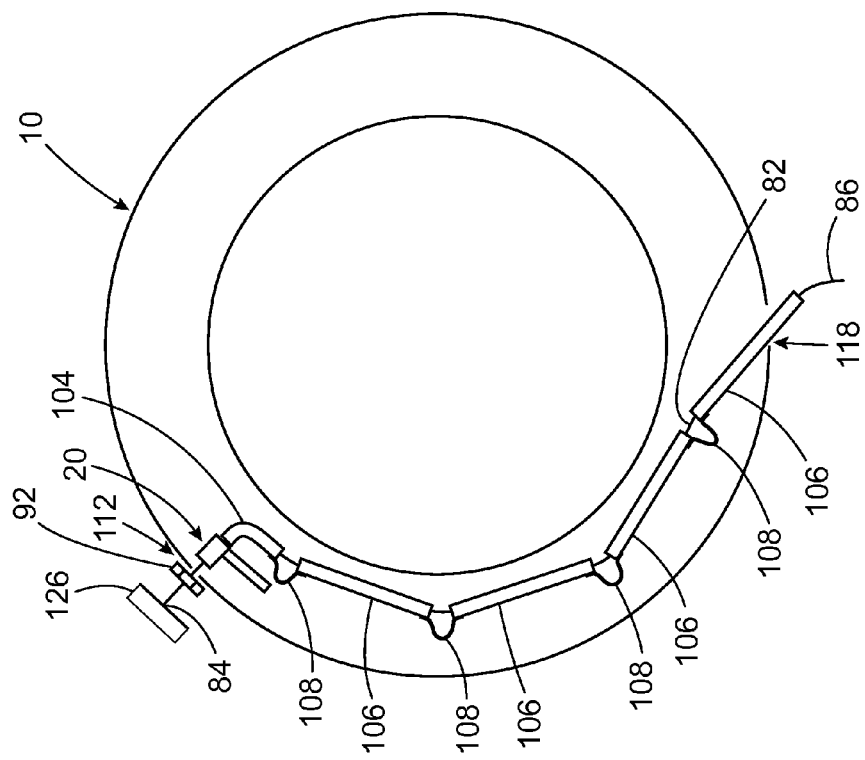
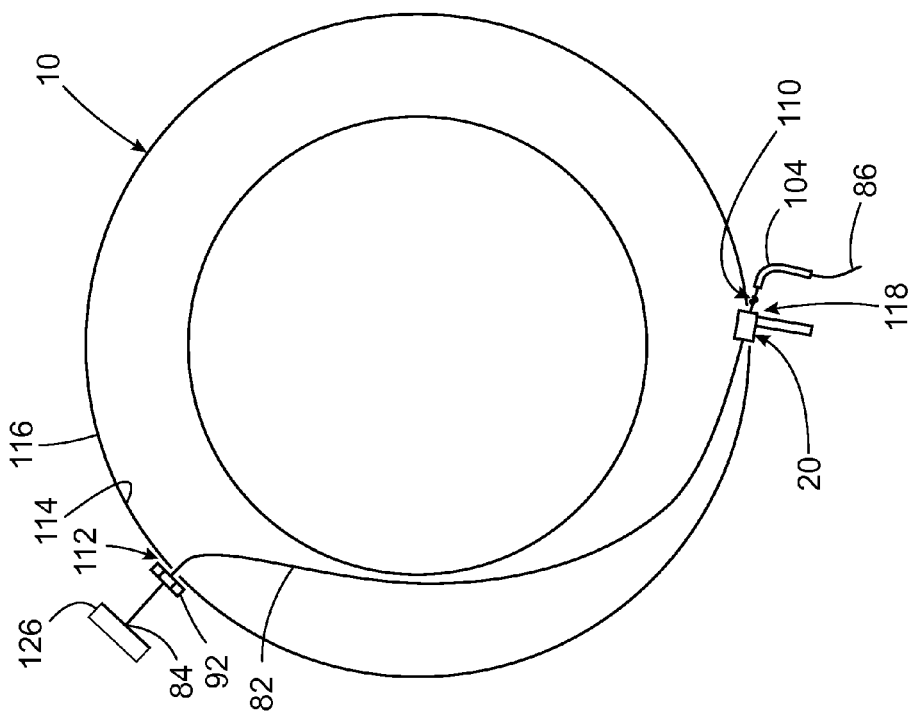

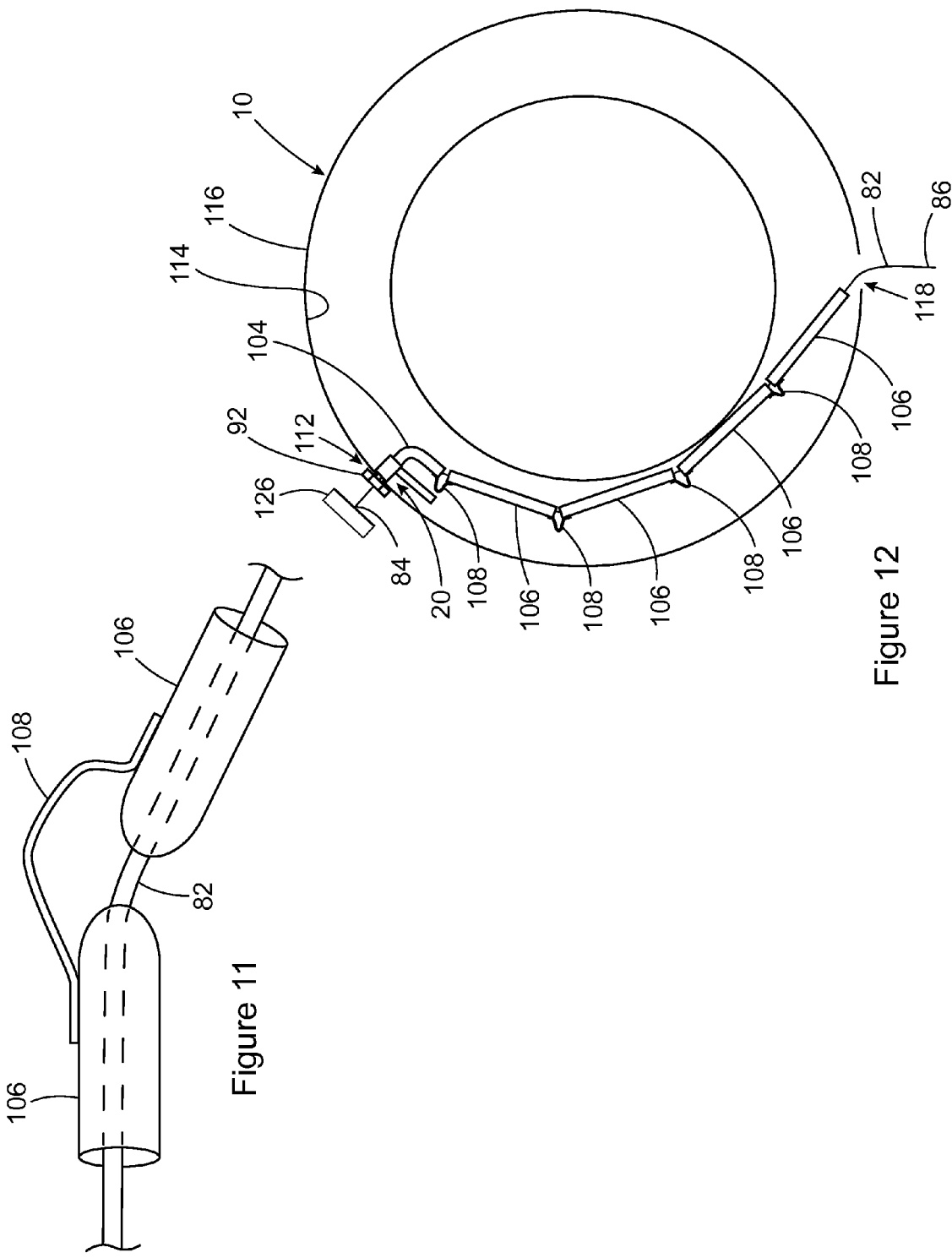

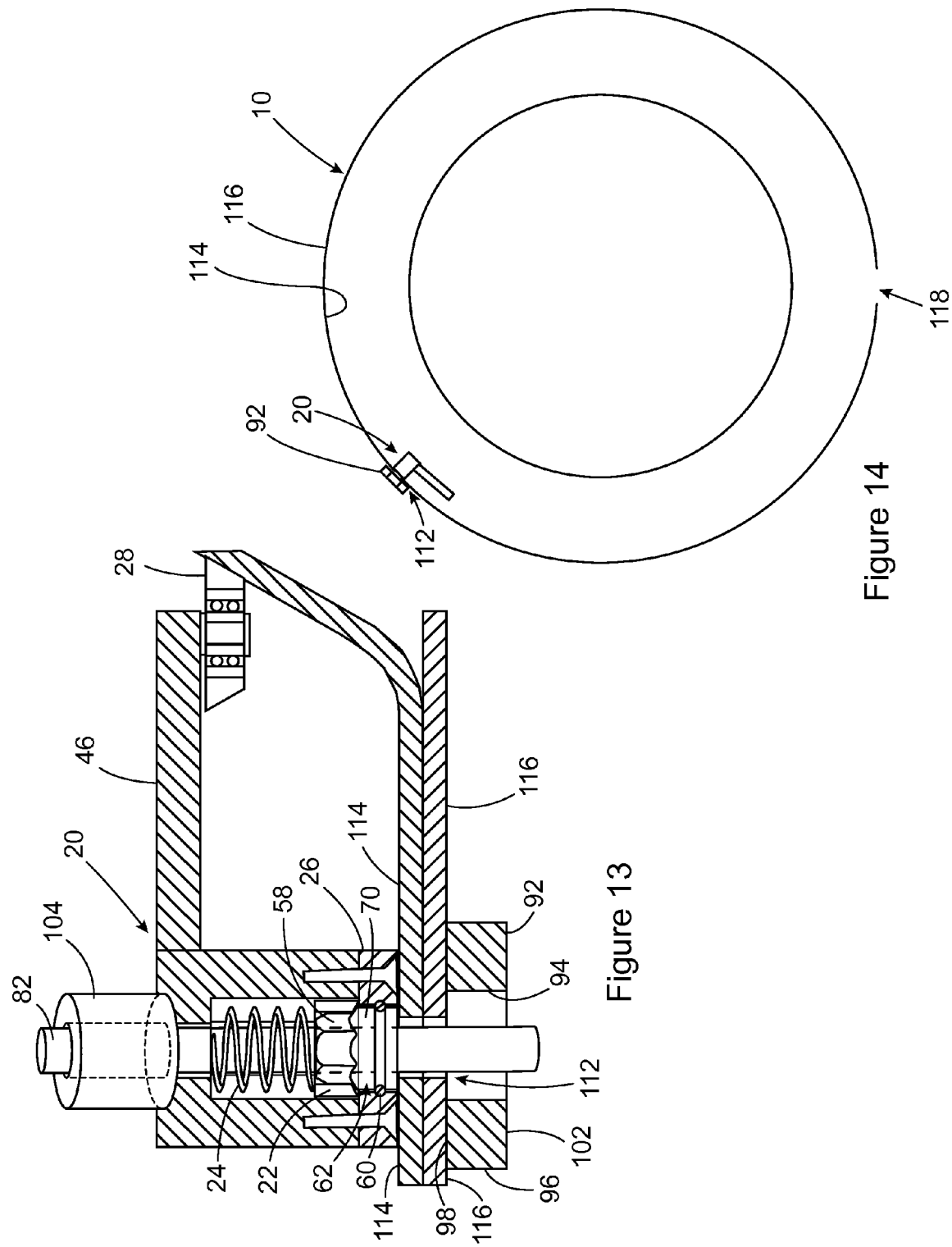

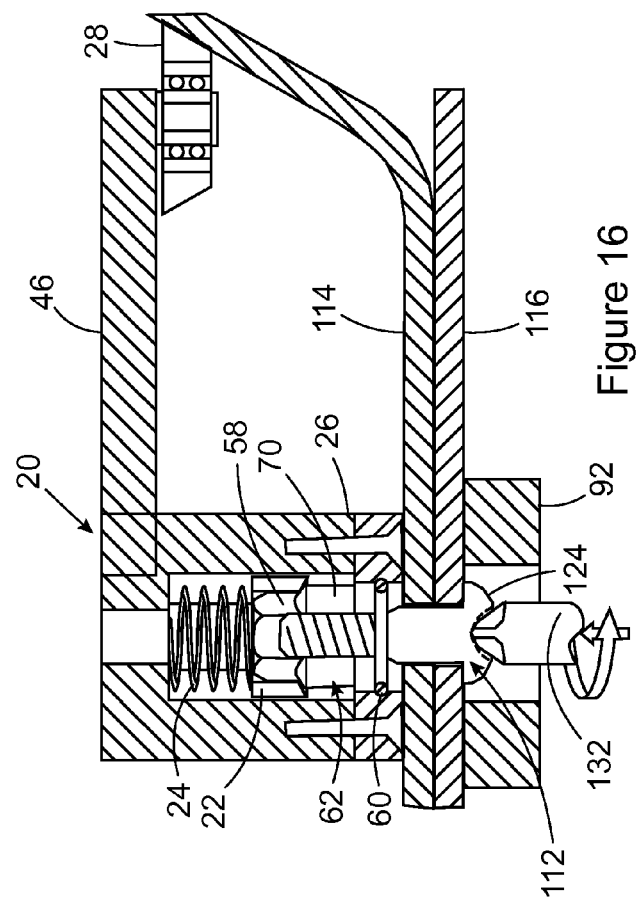
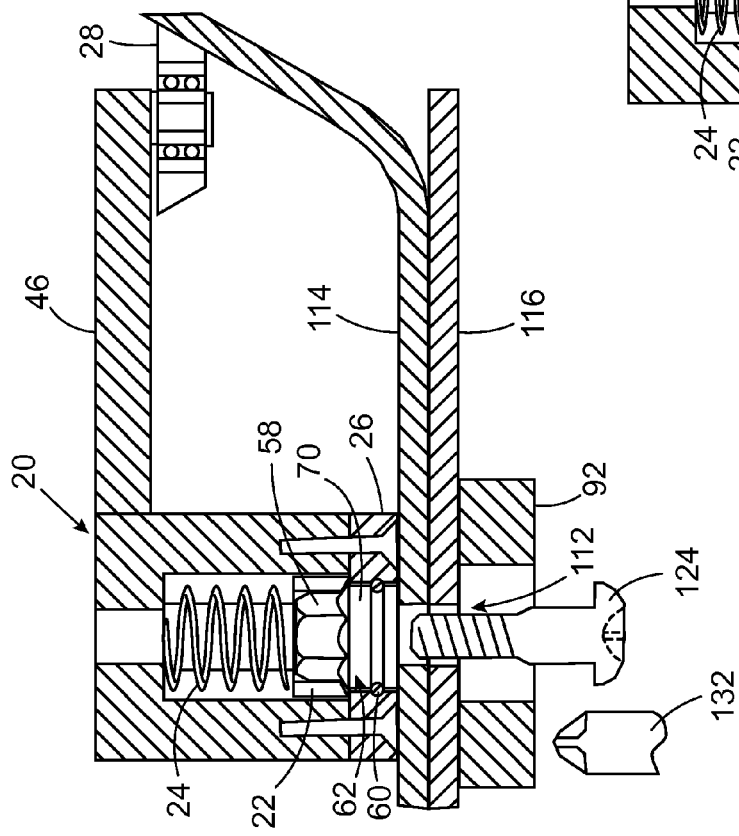

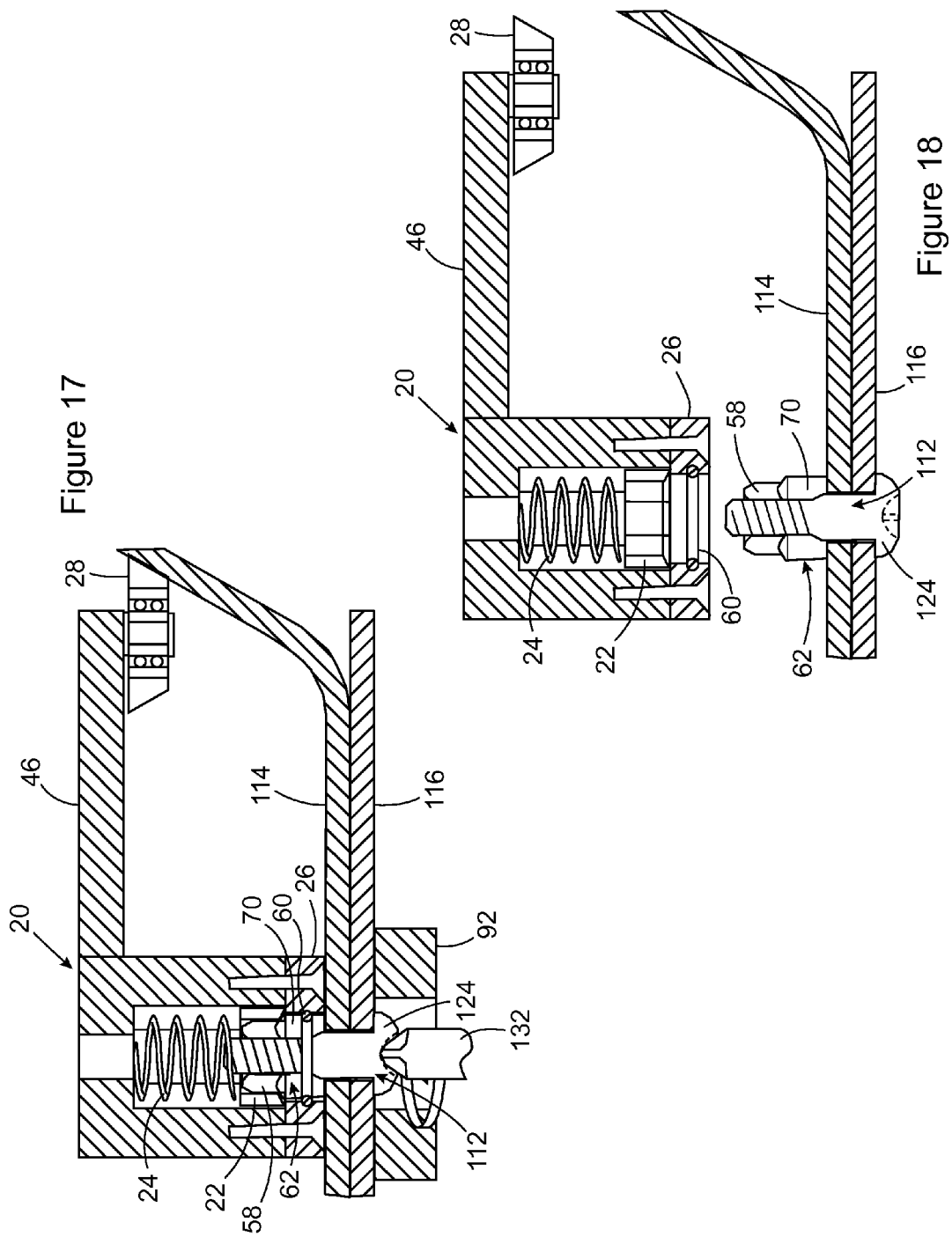

APPARATUS AND METHOD FOR LOCATING A NUT ON A BLIND SIDE OF A FASTENER HOLE

FIELD

The present invention pertains to an apparatus and its method of use in locating a first piece of a two piece fastener assembly, for example a nut of a nut and bolt fastener assembly on a blind side of a fastener hole in a structure wall where the fastener hole on the blind side of the wall is not manually accessible or not easily manually accessible. The apparatus then holds the nut in alignment with the fastener hole enabling the bolt of the fastener assembly to then be inserted through the fastener hole from the exterior of the structure and connected to the nut in the interior of the structure.

BACKGROUND

In large assembled structures, for example the housing structure of an aircraft jet engine, when a two piece fastener assembly, for example a nut and bolt assembly is lost from a fastener hole in the structure it is often very difficult to replace with a similar 2 piece fastener. The fastener hole missing the fastener assembly is often easily accessible from the exterior of the structure. However, in order to assemble a two piece fastener assembly in the fastener hole it is also necessary to access the fastener hole from the interior of the structure. This is often not possible without a major disassembly of the structure to access the fastener hole from the interior of the structure.

To address the problem of accessing a fastener hole from an interior of a structure without requiring a major disassembly of the structure, robotic crawlers could be developed. Such a robotic crawler would have the ability to hold to an interior surface of a wall of the structure as the crawler moves across the wall interior surface to position a fastener piece, for example a nut held by the crawler in alignment with the fastener hole. Once the nut was positioned in alignment with the fastener hole by the robotic crawler, a bolt could be inserted through the fastener hole and threaded into the nut to replace the fastener assembly missing from the fastener hole.

However, such robotic crawlers are disadvantaged in that they are expensive to manufacture. Additionally, the size of the robotic crawler may limit its access to areas inside an assembled structure such as a jet engine housing structure. Still further, operation of a robotic crawler to position a fastener piece in alignment with a fastener hole of a structure such as a jet engine housing structure requires a skilled operator for the crawler.

SUMMARY

The problems associated with replacing loose or missing fastener assemblies in fastener holes of an assembled structure such as a jet engine housing structure are overcome by the apparatus of the invention and its method of use.

The apparatus includes a flexible cord having a length with opposite proximal and distal ends. The length of the cord is more than sufficient to reach from the fastener hole, through the structure interior, to the access opening of the structure. The cord length and at least the cord distal end are dimensioned for insertion through the fastener hole from the structure exterior. In the method of using the apparatus, the cord distal end is inserted through the fastener hole from the structure exterior and then a portion of the cord length is inserted through the fastener hole. As the portion of the cord length is inserted through the fastener hole, the cord distal end moves through the structure interior toward the access opening of the structure. The cord distal end can move through the structured interior either by gravitation, or the cord distal end could be constructed of a metallic material and a source of magnetic force could be used to move the cord distal end toward the access opening. The cord is continued to be passed through the fastener hole from the structure exterior and then through the structure interior until the cord distal end passes through the structure access opening to the structure exterior.

The apparatus also includes a fastener piece holder that can receive and hold a fastener piece, for example the nut of the nut and bolt fastener assembly. The holder holds the nut against rotation about the center axis of the nut relative to the holder, but allows some limited axial movement of the nut relative to the holder. The holder has a bore that extends completely through the holder and is centered in the holder. The holder is attached to the cord by inserting the cord distal end through the nut held by the holder and through the holder bore. This mounts the holder and the fastener piece held by the holder for sliding movement over the cord length. The holder is dimensioned to pass through the entry opening of the structure and to pass through the structure interior to the fastener hole.

The apparatus also includes a tube assembly having a forward tube section that is dimensioned to receive the cord distal end and a portion of the cord length through the tube section. The tube section is pushed over the cord length to engage with the holder and thereby push the holder over the cord length toward the fastener hole.

The apparatus also includes a permanent magnet or an electromagnet or some other attraction device capable of holding the fastener piece holder against the interior surface of the structure wall from the exterior of the structure. With the holder positioning the nut in alignment with the fastener hole, the holder and the nut are held at their positions against the interior surface of the structure wall by the magnet at the exterior of the structure. With the nut held in its position against the structure wall interior surface by the magnet, the tube, assembly and the cord can be removed from the structure. The bolt of the two piece fastener assembly can then be inserted through the fastener hole from the exterior of the structure and threaded into the nut in the interior of the structure.

As the bolt is threaded into the nut, the torque on the bolt will have a tendency to rotate the nut and the fastener piece holder on the structure wall interior surface. To address this, the fastener piece holder is provided with a torque arm that projects radially from the holder. As the nut and holder are rotated in the interior of the structure, the torque arm will eventually come into contact with an object in the structure interior, for example a portion of the structure or another fastener in the structure wall. The engagement of the torque arm with this object will prevent further rotation of the holder and the nut held by the holder. This will enable the bolt to be torqued down into the nut held by the holder and complete the assembly of the bolt and nut fastener assembly from the exterior of the structure.

The magnet is then removed from the exterior of the structure, enabling the holder to be removed from the nut inside the structure. The holder is then removed from the interior of the structure.

The features, functions and advantages of the apparatus of the invention and its method of use that have been discussed can be achieved independently in various embodiments or may be combined in yet other embodiments further details of which can be seen with reference to the following description and drawings.

BRIEF DESCRIPTION OF THE DRAWINGS

FIG. 4 is a schematic representation of one embodiment of the apparatus in use.

FIG. 5 is a schematic representation similar to that of FIG. 4, but illustrating a further embodiment of the apparatus in use.

FIG. 6 is a schematic representation of a still further embodiment of the apparatus in use.

FIG. 7 is a representation the task where one part of a two piece fastener must be located on the inside of the fastener hole.

FIG. 8 is a representation of an initial step of the method of using the apparatus.

FIG. 9 is a representation of a still further step of the method of using the apparatus.

FIG. 10 is a representation of a further step of the method of using the apparatus.

FIG. 11 is an enlarged partial view of a portion of the apparatus.

FIG. 12 is a representation of a further step of the method of using the apparatus where the cord is withdrawn.

FIG. 13 is a cross section view illustrating the apparatus in a still further step of the method.

FIG. 14 is a representation of a further step of the method of using the apparatus.

FIG. 15 is a cross section view illustrating the apparatus in a still further step in the method of using the apparatus.

FIG. 16 is a cross section view illustrating the apparatus in a still further step in the method of using the apparatus.

FIG. 17 is a cross section view illustrating the apparatus in a still further step in the method of using the apparatus.

FIG. 18 is a cross section view illustrating the apparatus in a still further step in the method of using the apparatus.

DETAILED DESCRIPTION

Figure 1:
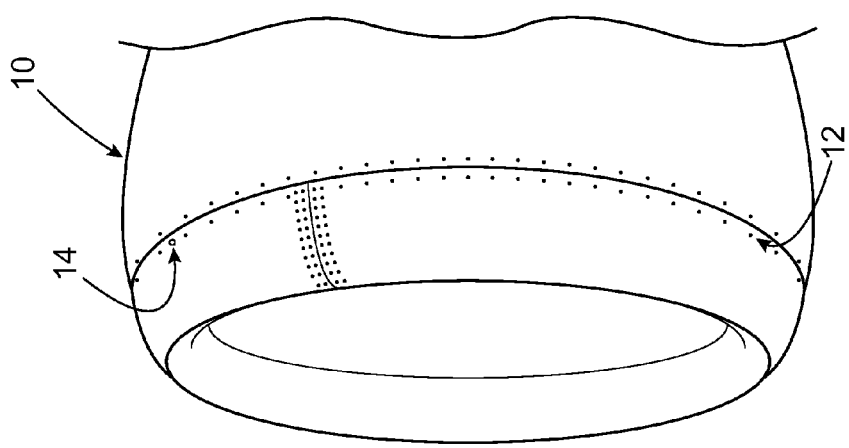
FIG. 1 is a partial view of the front of a jet engine cowling or housing structure illustrating only one operative environment of the apparatus and the method of the invention.

The apparatus of the invention is used according to a method of the invention in locating a first fastener piece of a two piece fastener assembly, for example a nut of a nut and bolt fastener assembly, on a blind side of a fastener hole inside a structure wall where the fastener hole is not manually accessible in the structure interior or is not easily manually accessible. FIG. 1 illustrates one example of an operative environment for the apparatus and its method of use. FIG. 1 illustrates the forward portion of a jet engine cowling structure 10. Several sections or walls of the structure are held together by fastener assemblies 12. Should one of the fastener assemblies 12 become loosened in or lost from its fastener hole 14 in a wall of the structure 10, it would be very difficult if not impossible to manually replace the two piece fastener assembly 12 from the exterior of the structure 10. Although structures 10 such as that shown in FIG. 1 often have access openings to the interior of the structure, if the open fastener hole 14 is remote from the access opening it may be difficult if not impossible to manually reach the open fastener hole 14 from the access opening. FIG. 1 is an illustration of an example of only one operative environment in which the apparatus and its method of use may be employed. The apparatus and its method of use may also be employed in many other environments in which it is difficult to manually reach a fastener hole on the blind side of a structure wall containing the fastener hole. The apparatus and its method of use could also be employed with many types of fastener assemblies other than those shown.

Figure 2:
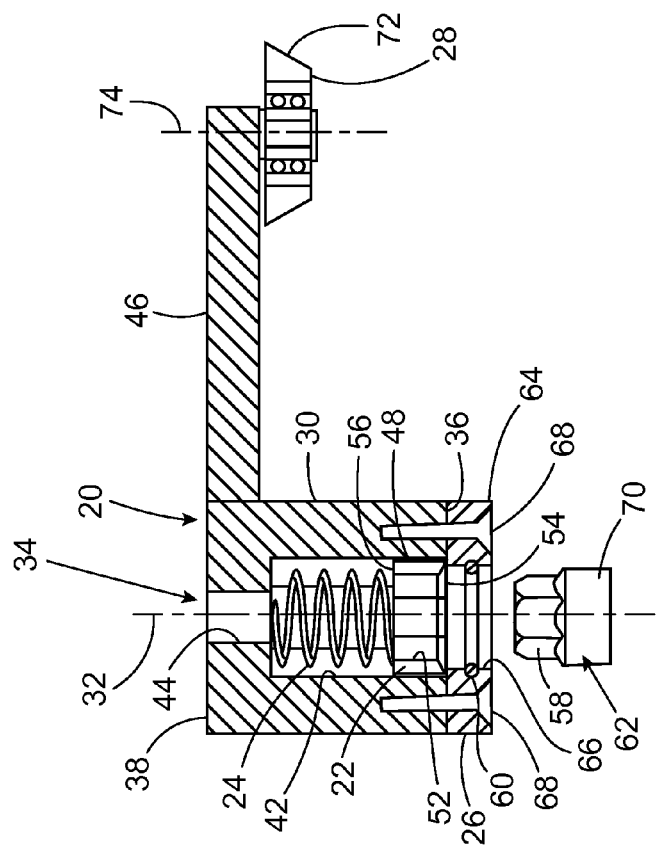
FIG. 2 is a partial cross sectioned elevation view of an advantageous embodiment of the apparatus.
Figure 3:
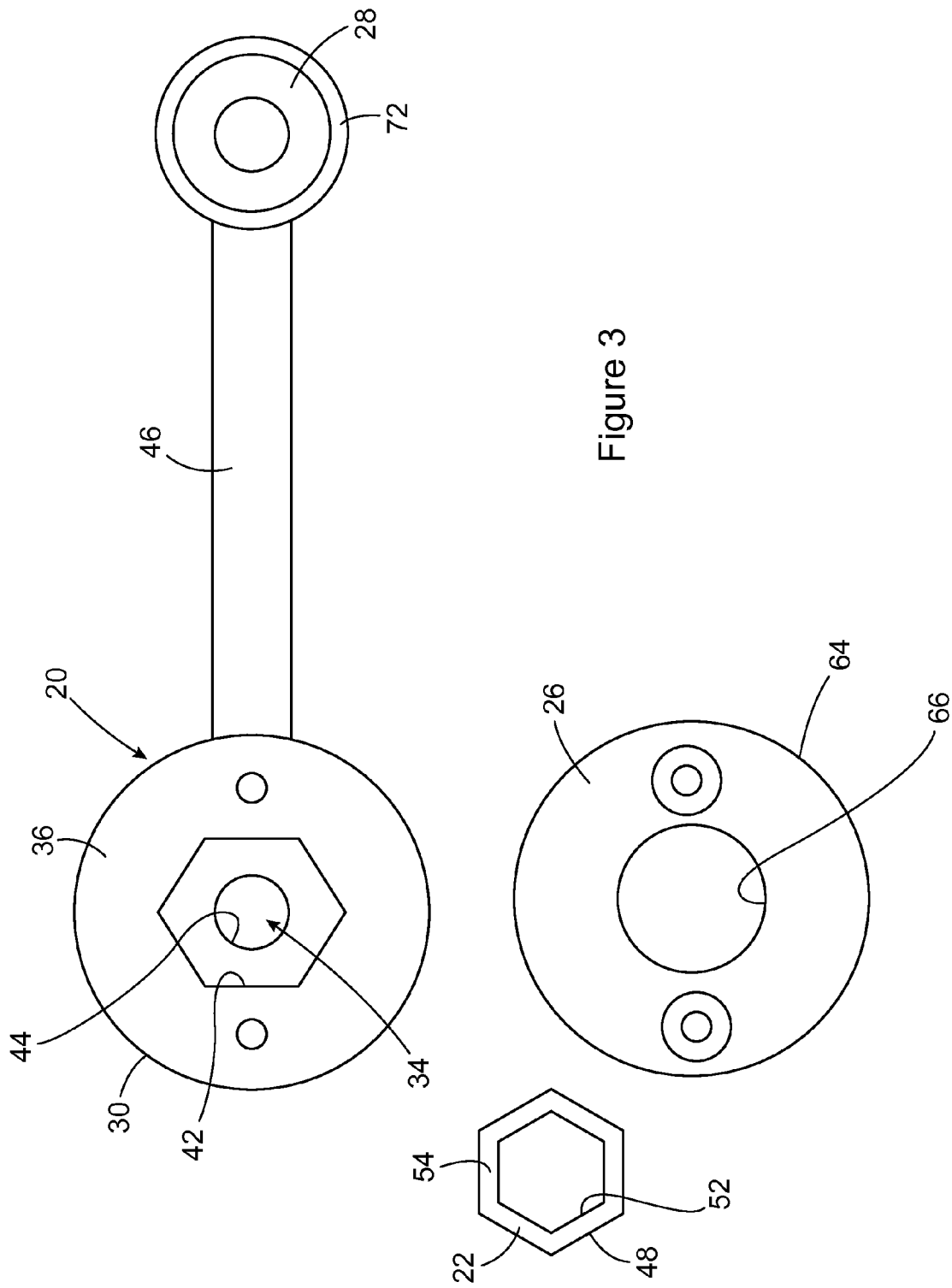
FIG. 3 is a plan view of disassembled component parts of the apparatus of FIG. 2.

The apparatus and method of the invention were developed to overcome the above described problem of reaching an open fastener hole 14 through an access opening of a structure 10 where the open fastener hole 14 is remote from the access opening and not manually reachable from the access opening. FIGS. 2 and 3 illustrate some of the component parts of an advantageous embodiment of the apparatus. The component parts of the apparatus shown in FIGS. 2 and 3 include a fastener piece holder 20, a box wrench insert 22, a spring 24, a base 26 and a wheel; assembly 28.

The fastener piece holder 20 is constructed of a non-magnetic material, for example a plastic. Other equivalent materials could be used. In the embodiment shown in the drawing figures, the holder 20 has a general cylindrical configuration defined by a cylindrical exterior surface 30 of the holder. The holder exterior surface 30 has a center access 32 that defines mutually perpendicular axial and radial directions relative to the holder 20. A center bore 34 extends through the holder 20 from a front, circular end face 36 of the holder to a rear, circular end face 38 of the holder. The bore 34 is coaxial with the holder center axis 32. A front portion of the bore is defined by an internal surface 42 of the bore having a hexagonal configuration in cross section. A rear portion of the bore 34 is defined by an interior surface 44 having a circular configuration in cross section. The holder 20 also has a torque arm 46 that extends radially outwardly from the holder cylindrical exterior surface 30. In the embodiment of the apparatus shown in FIG. 2, the torque arm 46 is parallel to and extends from the holder rear end face 38. In other embodiments the holder 20 could have an attached lanyard that could be employed in retrieving the holder from a structure interior.

The box wrench insert 22 is constructed of a non-magnetic or low permeability material, for example titanium. Other equivalent materials could be used. The box wrench insert 22 has an exterior surface 48 having a hexagonal configuration in cross section. The external surface 48 is dimensioned to fit in sliding engagement against the hexagonal interior surface of the holder bore front section 42. The insert 22 is free to move axially through the holder bore front section 42, but is restrained by the hexagonal interior surface of the bore front section 42 against rotation relative to the holder 20. Other configurations of the holder bore interior surface and the insert exterior surface could be employed that would allow the insert to slide through the holder bore while restraining the insert from rotating in the holder. The box wrench insert 22 has an interior bore defined by an interior surface 52 that extends through the insert from a front face 54 of the insert to a rear face 56 of the insert. The insert interior surface 52 has a hexagonal configuration in cross section that is dimensioned to receive a hexagonal exterior surface 58 of a first fastener piece 62 of a two piece fastener assembly, for example a nut of a nut and bolt fastener assembly. In other embodiments of the apparatus, the insert 22 could be provided with an interior bore having an interior surface configured to engage and hold other types of fasteners, for example a hollow bolt of a nut and bolt fastener assembly or a hollow screw of a nut and screw fastener assembly. The apparatus could also be used to assemble a three piece fastener assembly, for example a nut, a bolt and a washer in an open fastener hole.

The spring 24 is a conventional coil spring. The spring 24 is contained in the front section surface 42 of the holder interior bore between the box wrench insert 22 and the rear section surface 44 of the holder interior bore. In its position shown in FIG. 2, the spring is uncompressed. The spring 24 lightly biases or urges the box wrench insert 22 across the holder bore front section surface 42 toward the holder front end face 36 when an external force acts on the insert 22 urging the insert toward the holder rear end surface 38. Other equivalent types of biasing devices could be employed in place of the spring 24.

The base 26 has an annular configuration defined by a cylindrical exterior surface 64 and a cylindrical interior surface 66. The base 26 is constructed of a magnetic material, for example soft iron. Other equivalent materials could be used. The base exterior surface 64 has a diameter dimension that matches that of the holder exterior surface 30. The base interior surface 66 has a diameter dimension that is slightly smaller than the cross section dimension of the holder bore front section surface 42 but no smaller than the maximum external diameter of the fastener piece 62. The base 26 is attached to the housing front end face 36 by a pair of screw threaded fasteners 68. The dimensions of the base interior surface 66 retain the box wrench insert 22 inside the holder bore front section surface 42. The base interior surface 66 may have a frictional rubber insert 60 installed. The insert is to retain the fastener piece 62 in the fastener piece holder 20 with a light frictional restraint such that it does not fall out prematurely. The insert 60 could be an o-ring, a ball and detent or any other equivalent retention feature.

The wheel assembly 28 is mounted for rotation at the distal end of the holder torque arm 46. In the embodiment of the apparatus shown in FIGS. 2 and 3, the wheel assembly 28 has an exterior gripping surface 72 that is angled relative to a center access of rotation 74 of the bearing assembly. In other embodiments of the apparatus such as those represented in FIGS. 5 and 6, the wheel assembly could have a gripping surface that is parallel to the bearing assembly rotation axis, or the wheel assembly could be eliminated from the torque arm. Still further, in other embodiments of the apparatus the torque arm could project radially outwardly from the holder at some other location along the holder between the holder front end face 36 and rear end face 38. For example, the torque arm could project radially outwardly from the holder exterior surface adjacent to the holder front end surface 36 as represented in FIG. 6.

In addition to the fastener piece holder 20 of the apparatus, the apparatus includes a flexible cord 82 having a length that extends between opposite proximal 84 and distal 86 ends of the cord. The cord 82 is constructed of a non-magnetic material. The cord 82 could be of ferrous material, but not a magnet. In one embodiment of the cord 82 it could be constructed with a weight 88 at the cord distal end where the weight 88 is constructed of a magnetic material that is attracted to a magnet, but itself does not have a magnetic force. In the advantageous embodiment of the apparatus the cord 82 has a length between its proximal 84 and distal 86 ends that is at least twice the length of the distance between an open fastener hole in a structure and an access opening of the structure with which the apparatus is to be used.

The apparatus also includes an external device for holding the fastener piece holder against the structure wall interior surface from the structure exterior, such as a source of magnetic force 92. In the advantageous embodiment the source of magnetic force 92 is a permanent magnet. However an electromagnet or other equivalent source of a magnetic force may be used in place of the magnet. Additionally, some other equivalent device capable of holding the fastener piece holder to the structure interior surface from the exterior of the structure or the interior of the structure could be used instead of the magnet 92. The magnet 92 of the apparatus has an annular configuration with a cylindrical center bore defined by a cylindrical interior surface 94 of the magnet. The diameter dimension of the interior surface 94 is dimensioned to allow a second fastener piece, for example a threaded bolt of a nut and bolt fastener assembly to pass through the bore defined by the magnet interior surface 94. The magnet interior surface 94 is also dimensioned to be smaller than the diameter dimension of the holder housing exterior surface 30. The magnet 92 also has a cylindrical exterior surface 96, and substantially flat and parallel front 98 and rear 102 surfaces.

The apparatus also includes an articulated tube assembly comprising a forward tube section 104 and a plurality of advancing tube section 106 that are held together in series by tethers 108 that extend between adjacent tube sections as represented in FIGS. 10 and 12. Each of the tube sections of the tube assembly are dimensioned to allow at least the cord distal end 86 and a portion of the length of the cord 82 to be passed through the forward tube section 104 and the plurality of advancing tube sections 106. As represented in FIGS. 9, 10 and 12, the forward tube section 104 has an angled configuration that enables the forward tube section 104 to position the fastener piece holder 20 against the structure wall interior surface. The advancing tube sections 106 all have generally straight configurations of equal length. The tethers 108 that connect the adjacent tube sections allow the sections to articulate relative to each other as they are pushed through the interior of a structure. In a further embodiment of the tube assembly represented in FIG. 11, the ends of adjacent tube sections are given rounded configurations to facilitate the articulating movement of the adjacent tube sections. In other embodiments of the apparatus, the forward tube section 104 could be the only tube section of the tube assembly and the advancing tube sections 106 could be replaced by another mechanism that could be used to push the forward tube section 104 over the length of the cord 82, for example a rigid yet flexible wire. Still further, the tube assembly could be replaced with a mechanism such as a stopper 110 that could be secured to the cord 82 between the fastener piece holder 20 on the cord and the cord distal end 86 as represented in FIG. 9. The stopper 110 would be dimensioned to engage against the fastener piece holder 20 and prevent the holder from sliding over the cord 82 toward the cord distal end 86. By exerting a pulling force on the cord proximal end 84 from the structure exterior, the length of cord 82 would move from the structure access opening, through the structure interior and then through the open fastener hole. The stopper 110 secured to the cord would engage against the fastener piece holder 20 and move the fastener piece holder with the cord toward the fastener hole until the stopper 110 holds the fastener piece holder 20 against the structure interior wall with the nut held by the fastener piece holder 20 in alignment with the open fastener hole in the structure wall.

FIGS. 7-19 illustrate an advantageous method of using the apparatus of the invention to locate a nut on a blind side of a fastener hole against an interior surface of a structure wall so that a bolt can be installed through the fastener hole and torqued into the nut from the exterior of the structure wall. FIG. 7 is a schematic representation of the forward end of the double walled jet engine cowling or housing shown in FIG. 1.

There is an open fastener hole 112 through a structure wall at the upper left of the housing structure. The structure wall has an interior surface 114 facing an interior of the housing structure and an opposite exterior surface 116 facing the exterior of the housing structure. There is an access opening 118 through the structure wall at the six o'clock position on the cowling structure housing. A two-piece fastener assembly including a nut 62 and a bolt 124 for the open fastener hole 112 are also depicted in FIG. 7.

The method of using the apparatus begins by inserting the cord distal end 86 from the structure exterior, through the open fastener hole 112 into the structure interior. A portion of the length of the cord 82 is then also inserted through the fastener hole 112. As the portion of the cord 82 inserted through the fastener hole 112 is increased, the weight 88 at the cord distal end 86 pulls the cord distal end down through the interior of the housing structure as represented in FIG. 8. In other embodiments, the weight 88 could be magnetic and a source of magnetic force could be inserted through the access opening 118 to attract the weight 88 toward the access opening 118. The cord 82 is continued to be inserted from the structure exterior through the fastener hole 112 and into the structure interior until the weight 88 and the cord distal end 86 pass through the access opening 118 to the structure exterior. The cord then defines a cord path through the access opening 118, through the structure interior and to the fastener hole 112 in the wall interior surface 114.

With the cord distal end 86 and a portion of the cord length extending through the access opening 118 to the structure exterior, the cord proximal end 84 is fixed or held stationary in some manner relative to the housing structure so that the cord 82 will no longer pass through the fastener hole 112 in response to any pulling force on the portion of the cord extending through the structure interior. The fixed cord proximal end 84 is represented at 126 in FIG. 9.

The fastener piece holder 20 is then prepared for being attached to the cord 82 by attaching a first fastener piece of a two piece fastener assembly to the holder. The first fastener piece or nut 62 is attached to the holder 20 in the manner represented in FIG. 2 with the hexagonal exterior surface 58 of the nut 62 being inserted into the box wrench interior surface 52 and the nut cylindrical surface portion 70 being inserted into the base cylindrical interior surface 66 which firmly holds the nut 62 in friction engagement inside the holder 20. The cord distal end 86 is then inserted through the internally threaded bore of the nut 62 and through the interior bore 34 of the holder 20. This attaches the holder 20 to the cord 82 for sliding movement of the holder guided along the cord path from the cord distal end 86 toward the portion of the cord extending through the fastener hole 112 as represented in FIG. 9. With the holder 20 and the nut 62 held on the holder attached to the cord 82, the holder 20 is then inserted through the housing access opening 118 into the interior of the housing structure as represented in FIG. 9.

The articulated tube assembly comprising the forward tube section 104 and the plurality of advancing tube sections 106 held together in series by the tethers 108 is then attached to the cord 82 by inserting the cord distal end 86 through the forward tube section 104 and then through the series of advancing tube sections 106. This is represented in FIG. 10. The tube assembly is then pushed along the portion of the cord 82 extending through the structure interior until the forward tube section 104 positions the holder 20 against the housing wall interior surface 114 with the nut 62 held by the holder 20 aligned with the fastener hole 112. This is represented in FIG. 12.

To hold the fastener piece holder 20 and the nut 62 held by the holder against the wall interior surface 114 in alignment with the fastener hole 112, the source of magnetic force 92 is positioned against the wall exterior surface 116 in alignment with the fastener hole 112. The source of magnetic force 92 or magnet attracts the base 26 to the wall interior surface 114 and holds the fastener piece holder 20 and the nut 62 against the wall interior surface 114. This is represented in FIGS. 13 and 14. With the fastener piece holder 20 and the nut 62 held firmly against the wall interior surface 114 by the source of magnetic force 92 on the wall exterior surface 116, the cord proximal end 84 fixed at 126 can then be released and the cord 82 and the tube assembly can then be removed from the structure interior through the access opening 128. This leaves the holder 20 and nut 62 held to the wall interior surface only by the magnet 92. This is represented in FIG. 14.

The second piece of the fastener assembly, the bolt 124 of the nut and bolt fastener assembly is then inserted through the fastener hole 112 from the structure exterior. This is represented in FIG. 15. The bolt 124 is inserted through the magnet bore defined by the magnet interior surface 94, through the fastener hole 112 and into the interior threaded bore of the nut 62. In screw threading the bolt 124 into the nut 62, a screwdriver or a screwdriver bit 132 is inserted into the slotted head of the bolt 124 and exerts both an axial force on the bolt 124 and a rotational force on the bolt 124. This causes the bolt 124 to push against the nut 62 and move the nut 62 and the box wrench insert 22 into the holder bore and across the front section surface 42. This movement of the nut 62 and the box wrench insert 22 across the holder bore front section surface 42 is lightly resisted by the compression of the spring 24. This limited movement of the nut 62 and the box wrench insert 22 relative to the holder 18 allows the screwdriver 132 to exert an axial force on the bolt 124 to advance the bolt into the nut 62 without separating the holder 20 from the wall interior surface 114. This is represented in FIG. 16. As the screwdriver 132 screws the bolt 124 into the nut 62 the rotational force of the bolt 124 may cause the fastener piece holder 20 to rotate on the structure wall interior surface 114. The prevention of such rotation is the function of the torque arm 46. The torque arm 46 projects radially outwardly from the exterior surface 30 of the fastener piece holder 20 so that, as the fastener piece holder 20 is rotated on the structure wall interior surface 114 by the rotation of the bolt 124, eventually the torque arm 46 or the exterior surface of the bearing assembly 72 on the torque arm will engage with a side wall or a bulkhead of the structure as represented in FIG. 16, or the torque arm 46 will engage with another adjacent fastener as represented in FIG. 6. This will then hold the fastener piece holder 20 against further rotation on the structure wall interior surface 114 and allow the bolt 124 to be torqued into the nut 62 as represented in FIG. 17. As the bolt 124 is torqued into the nut 62, the nut and the box wrench insert 22 move across the holder bore front section surface 42 relaxing the spring 24 until the nut 62 engages firmly against the structure wall interior surface 114 as represented in FIG. 17. This secures the two-piece fastener assembly comprised of the nut 62 and bolt 124 in the fastener hole 112.

Figure 19:
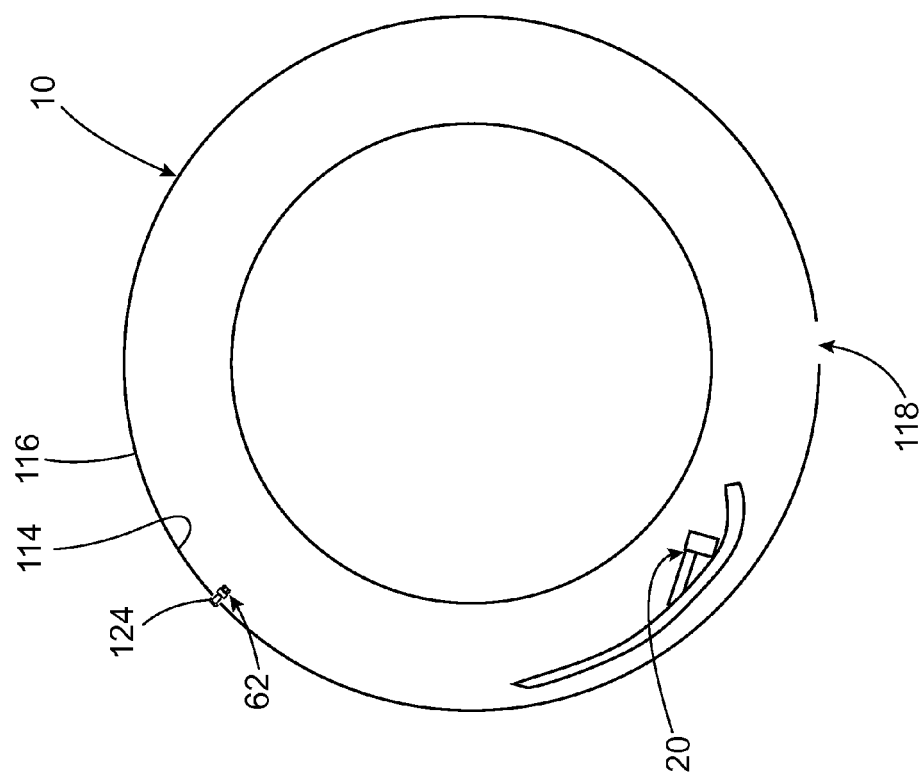
FIG. 19 is a representation of a further step of the method of using the apparatus.

The method of locating the nut of the two piece fastener assembly on the blind side of the fastener hole and torqueing the bolt of the fastener assembly into the nut is then completed by removing the source of magnetic force 92 from the structure exterior surface 116. This releases the fastener piece holder 20 from the structure wall interior surface 114 allowing the holder to fall through the structure interior toward the bottom of the structure interior where the holder 20 can be retrieved through the structure access opening 118. This is represented in FIG. 19.

The apparatus comprising the fastener piece holder 20, the cord 82, the source of magnetic force 92 and the tube assembly is inexpensive to manufacture, is dimensioned to pass through the interior of most structures to reach a blind side of a fastener hole, and does not require special training to use. In view of the foregoing, it will be seen that the several advantages of the apparatus and method of the invention are achieved and attained.

As various modifications could be made in the constructions of the apparatus herein described and illustrated and its method of use without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. A method for connecting a first fastener piece and a second fastener piece of a first and second fastener piece assembly in a fastener hole through a wall of a structure where the wall has an interior surface facing an interior of the structure and an opposite exterior surface facing an exterior of the structure, the structure having an access opening through the wall providing access to the structure interior from the structure exterior, the access opening being remote from the fastener hole, the method comprising:
 inserting a flexible cord through the fastener hole from the structure exterior where the cord has a length with opposite proximal and distal ends and the cord distal end is inserted through the fastener hole from the structure exterior to the structure interior, then a portion of the cord length is inserted through the fastener hole from the structure exterior to the structure interior causing the cord distal end to move through the structure interior and then causing the cord distal end to move through the access opening to the structure exterior where the portion of the cord length inserted through the fastener hole extends from the access opening through the structure interior to the fastener hole at the wall interior surface;
 attaching the first fastener piece to a fastener piece holder and then attaching the fastener piece holder to the cord;
 moving the fastener piece holder and the first fastener piece through the access opening and then through the structure interior guided by the cord from the access opening to the fastener hole in the interior surface of the structure wall;
 holding the fastener piece holder to the interior surface of the structure wall with the first fastener piece aligned with the fastener hole;
 connecting the second fastener piece to the first fastener piece from the structure exterior where the connected first and second fastener piece assembly extends through the fastener hole; and,
 removing the fastener piece holder from the structure interior.

2. The method of claim 1, further comprising:
 moving the fastener piece holder and the first fastener piece through the structure interior to the fastener hole by sliding the fastener piece holder and the first fastener piece along the portion of the cord length that extends from the access opening through the structure interior to the fastener hole.

3. The method of claim 1, further comprising:
 constructing at least a portion of the fastener piece holder from a magnetic material; and,
 externally holding the fastener piece holder to the interior surface of the structure wall by locating a source of magnetic force at the structure wall exterior surface opposite the fastener piece holder on the structure wall interior surface.

4. The method of claim 1, further comprising:
 using a threaded nut as the first fastener piece and using a threaded bolt as the second fastener piece.

5. The method of claim 1, further comprising:
 moving the cord distal end from the fastener hole through the structure interior and through the access opening by gravitational force on the cord distal end.

6. The method of claim 1, further comprising:
 providing a magnetic material at the cord distal end and causing the cord distal end to move through the structure interior from the fastener opening to the access opening and through the access opening by a magnetic force attracting the cord distal end.

7. The method of claim 1, further comprising:
 rotating the second fastener piece relative to the first fastener piece to connect the first and second fastener pieces; and,
 providing the fastener piece holder with an exterior configuration that will engage with an adjacent object in the structure interior and prevent the fastener piece holder from rotating on the structure wall interior surface in response to the rotation of the second fastener piece.

8. The method of claim 1, further comprising:
 providing the fastener piece holder with an internal spring that enables the first fastener piece held by the first fastener piece holder to be moved in the first fastener piece holder by the second fastener piece being screw threaded into the first fastener piece without separating the fastener piece holder from being held against the structure wall interior surface.

9. The method of claim 2, further comprising:
 sliding the fastener piece holder and the first fastener piece held by the fastener piece holder along the portion of the cord length with a tube assembly that is positioned over the cord distal end and moved over the cord to engage with the fastener piece holder and push the fastener piece holder along the portion of the cord to the fastener hole at the structure wall interior surface.

10. The method of claim 1, further comprising:
 moving the fastener piece holder and the first fastener piece through the access opening and then through the structure interior guided by the cord from the access opening to the fastener hole in the structure wall interior surface by positioning a stopper on the cord between the fastener piece holder and the cord distal end and moving the cord from the access opening through the structure interior and through the fastener hole to the structure exterior wherein the stopper engages with the fastener piece holder and moves the fastener piece holder to the fastener hole at the structure wall interior surface.

* * * * *